(12) United States Patent
Allan et al.

(10) Patent No.: US 12,739,673 B2
(45) Date of Patent: Sep. 15, 2026

(54) CELLULAR FIELD TESTING AUTOMATION TOOL: AUTOMATION OF EMERGENCY LOCATION ACCURACY IMPROVEMENTS

(71) Applicant: DISH Wireless L.L.C., Englewood, CO (US)

(72) Inventors: Andrew Allan, Littleton, CO (US); In-Kyung Kim, Highlands Ranch, CO (US); Yohannes Tolossa, Gainesville, VA (US)

(73) Assignee: DISH Wireless L.L.C., Englewood, CO (US)

(*) Notice: Subject to any disclaimer, the term of this patent is extended or adjusted under 35 U.S.C. 154(b) by 190 days.

(21) Appl. No.: 18/540,581

(22) Filed: Dec. 14, 2023

(65) Prior Publication Data

US 2025/0203411 A1 Jun. 19, 2025

(51) Int. Cl.
*H04W 24/08* (2009.01)
*H04L 43/0817* (2022.01)
(Continued)

(52) U.S. Cl.
CPC ......... *H04W 24/08* (2013.01); *H04L 43/0817* (2013.01); *H04W 64/003* (2013.01); *H04W 76/50* (2018.02)

(58) Field of Classification Search
CPC ....... H04W 4/02; H04W 4/029; H04W 64/00; H04W 4/025; H04W 24/08; H04W 76/50;
(Continued)

(56) References Cited

U.S. PATENT DOCUMENTS 11,076,346 B2 7/2021 Chinbe et al.
11,765,789 B1 9/2023 Zheng
(Continued)

FOREIGN PATENT DOCUMENTS

CN 102595435 B 8/2015

OTHER PUBLICATIONS

Nikhil Rangaraajan Vijayakumar et al., “Cellular Field Testing Automation Tool,” U.S. Appl. No. 18/228,848, filed Aug. 1, 2023. (38 Pages).

(Continued)

*Primary Examiner* — Shukri Taha
(74) *Attorney, Agent, or Firm* — Kipman T. Werking; Frontier IP Law PLLC

(57) ABSTRACT

A method may include (i) detecting, by a cellular field testing tool in response to a device under test making an emergency call, multiple location data structures that each provide respective indications of a location of the device under test, (ii) selecting, by the cellular field testing tool, a comparison location data structure from the multiple location data structures by applying a selection policy to the multiple location data structures, (iii) comparing, by the cellular field testing tool, the comparison location data structure to an identification of a location of the device under test according to a ground truth database, and (iv) outputting, by the cellular field testing tool, an indication of whether the device under test passes or fails a corresponding performance test based on comparing the comparison location data structure to the identification of the location of the device under test according to the ground truth database.

20 Claims, 21 Drawing Sheets

(51) Int. Cl.
*H04W 4/029* (2018.01)
*H04W 64/00* (2009.01)
*H04W 76/50* (2018.01)

(58) Field of Classification Search
CPC . H04W 43/0817; H04W 64/003; G06F 16/29; H04L 67/52
See application file for complete search history.

(56) References Cited

U.S. PATENT DOCUMENTS 12,363,566 B2 7/2025 Naseef
2005/0272445 A1* 12/2005 Zellner ............. H04M 3/42136 455/456.2
2012/0035904 A1 2/2012 Seckendorf et al.
2014/0105058 A1 4/2014 Hu et al.
2014/0187172 A1 7/2014 Partee
2014/0280904 A1 9/2014 Bugenhagen
2015/0140956 A1* 5/2015 Prewitt, II ............ H04M 3/362 455/405
2015/0189525 A1* 7/2015 Schmidt ................ H04W 24/08 455/436
2015/0264591 A1 9/2015 Baeder
2016/0227423 A1 8/2016 Bahr
2016/0277939 A1 9/2016 Bertrand et al.
2016/0373944 A1 12/2016 Jain et al.
2017/0195357 A1 7/2017 Sundhar et al.
2017/0214734 A1 7/2017 Sun
2017/0317907 A1 11/2017 Chinbe et al.
2018/0084380 A1* 3/2018 Lucas .................... G06Q 50/01
2019/0215707 A1 7/2019 Jackson
2019/0377027 A1 12/2019 Rivoir
2021/0326680 A1 10/2021 Chaaraoui et al.
2021/0385646 A1 12/2021 Liu et al.
2022/0140919 A1 5/2022 Linkola
2023/0370874 A1 11/2023 Wu
2023/0380012 A1 11/2023 Zheng
2024/0187958 A1* 6/2024 Yan ....................... H04W 40/02
2024/0361469 A1* 10/2024 Dupray ................ H04W 4/021

OTHER PUBLICATIONS

Nikhil Rangaraajan Vijayakumar, "Cellular Field Testing Automation Tool: Pass Fail Analysis and Test Scenario Recovery," U.S. Appl. No. 18/385,297, filed Oct. 30, 2023. (52 Pages).

Nikhil Rangaraajan Vijayakumar et al., "Cellular Field Testing Automation Tool Including Carrier Aggregation Combination Alignment," U.S. Appl. No. 18/535,795, filed Dec. 11, 2023. (47 Pages).

Nikhil Rangaraajan Vijayakumar et al., "Cellular Field Testing Automation Tool: Automated Communication Channel Handover," U.S. Appl. No. 18/395,237, filed Dec. 22, 2023. (52 Pages).

Nikhil Rangarajan Vijayakumar et al., "Cellular Field Testing Automation Tool Including Network Conditions Monitor, Audible and Visible Conclusion Alarms, and Data Stalls," U.S. Appl. No. 18/397,781, filed Dec. 27, 2023. (60 Pages).

* cited by examiner

CELLULAR FIELD TESTING AUTOMATION TOOL: AUTOMATION OF EMERGENCY LOCATION ACCURACY IMPROVEMENTS

BRIEF SUMMARY

This disclosure is generally directed to a cellular field testing automation tool and improvements thereof. In one example, a method includes (i) detecting, by a cellular field testing tool in response to a device under test making an emergency call, multiple location data structures that each provide respective indications of a location of the device under test, (ii) selecting, by the cellular field testing tool, a comparison location data structure from the multiple location data structures by applying a selection policy to the multiple location data structures, (iii) comparing, by the cellular field testing tool, the comparison location data structure to an identification of a location of the device under test according to a ground truth database, and (iv) outputting, by the cellular field testing tool, an indication of whether the device under test passes or fails a corresponding performance test based on comparing the comparison location data structure to the identification of the location of the device under test according to the ground truth database.

In some examples, the selection policy selects the comparison location data structure at least in part by comparing an indication of horizontal and vertical uncertainty for the comparison location data structure with an indication of horizontal and vertical uncertainty for a distinct data structure within the multiple location data structures.

In some examples, the selection policy selects the comparison location data structure at least in part by comparing the indication of horizontal and vertical uncertainty for the comparison location data structure with a respective indication of horizontal and vertical uncertainty for each remaining distinct data structure within the multiple location data structures.

In some examples, the ground truth database is derived from a regulatory authority.

In some examples, the performance test indicates whether the device under test satisfies a regulation.

In some examples, the regulation specifies a 50 meter tolerance for horizontal accuracy.

In some examples, the regulation specifies a three meter tolerance for vertical accuracy.

In some examples, the regulation specifies that a percentage of wireless calls during the performance test satisfies a horizontal tolerance and a vertical tolerance.

In some examples, the performance test obviates a requirement for a user of the cellular field testing tool to manually activate a global positioning system component of the device under test.

In some examples, the performance test measures performance of the device under test within at least two distinct morphologies.

In some examples, a system may include a physical computing processor and a non-transitory computer-readable medium encoding instructions that, when executed by the physical computing processor, cause the physical computing processor to perform operations comprising (i) detecting, by a cellular field testing tool in response to a device under test making an emergency call, multiple location data structures that each provide respective indications of a location of the device under test, (ii) selecting, by the cellular field testing tool, a comparison location data structure from the multiple location data structures by applying a selection policy to the multiple location data structures, (iii) comparing, by the cellular field testing tool, the comparison location data structure to an identification of a location of the device under test according to a ground truth database, and (iv) outputting, by the cellular field testing tool, an indication of whether the device under test passes or fails a corresponding performance test based on comparing the comparison location data structure to the identification of the location of the device under test according to the ground truth database.

In one example, a computer-readable medium encodes instructions that, when executed by at least one physical processor of a computing device, cause the computing device to perform operations comprising (i) detecting, by a cellular field testing tool in response to a device under test making an emergency call, multiple location data structures that each provide respective indications of a location of the device under test, (ii) selecting, by the cellular field testing tool, a comparison location data structure from the multiple location data structures by applying a selection policy to the multiple location data structures, (iii) comparing, by the cellular field testing tool, the comparison location data structure to an identification of a location of the device under test according to a ground truth database, and (iv) outputting, by the cellular field testing tool, an indication of whether the device under test passes or fails a corresponding performance test based on comparing the comparison location data structure to the identification of the location of the device under test according to the ground truth database.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
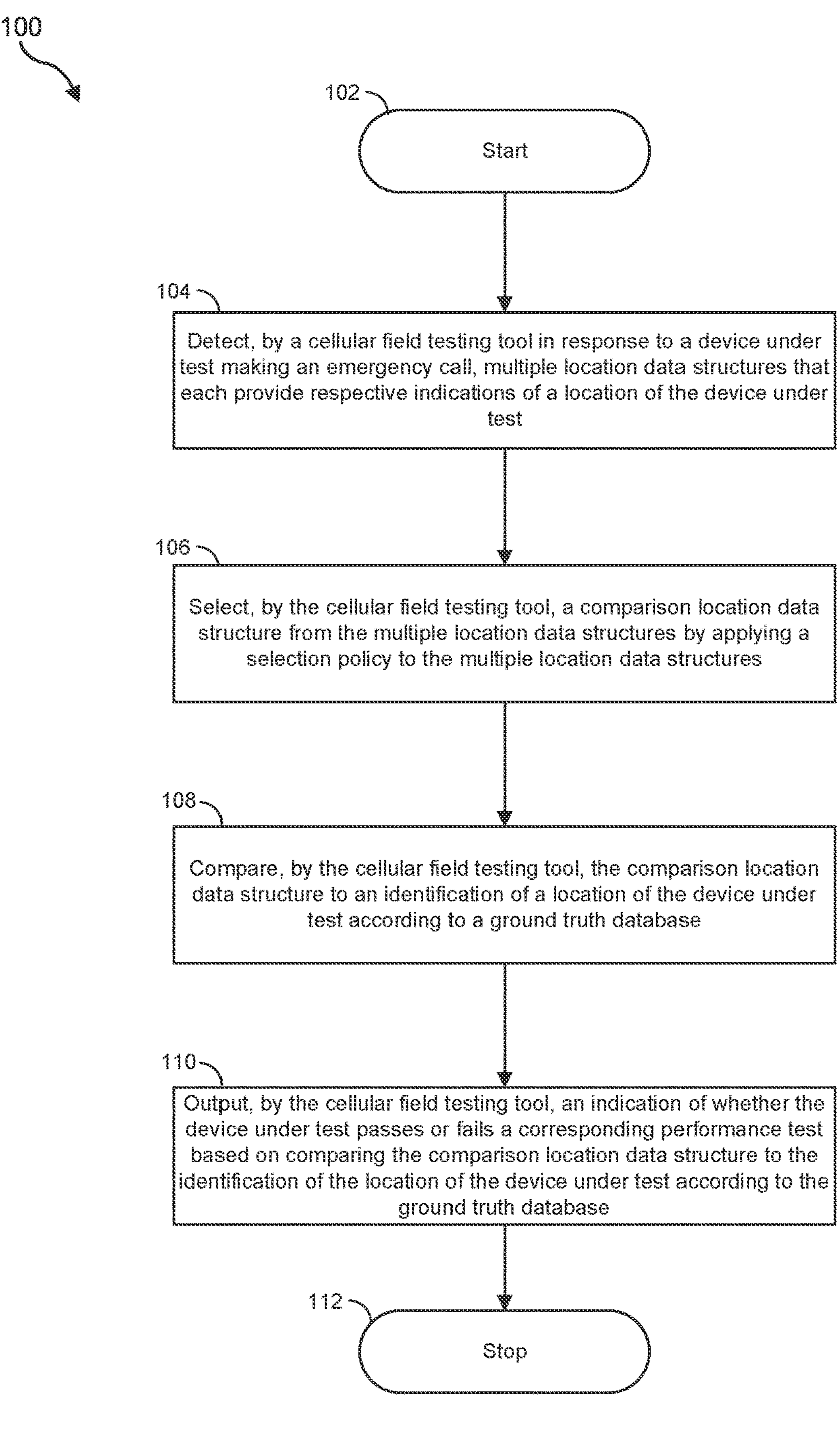
FIG. 1 shows a flow diagram for a method for a cellular field testing automation tool with automation of location accuracy.

FIG. 1 shows a flow diagram for an example method 100. At step 102, method 100 may begin. At step 104, a cellular field testing tool may detect, in response to a device under test making an emergency call, multiple location data structures that each provide respective indications of a location of the device under test. At step 106, the cellular field testing tool may select a comparison location data structure from the multiple location data structures by applying a selection policy to the multiple location data structures. At step 108, the cellular field testing tool may compare the comparison location data structure to an identification of a location of the device under test according to a ground truth database. At step 110, the cellular field testing tool may output an indication of whether the device under test passes or fails a corresponding performance test based on comparing the comparison location data structure to the identification of the location of the device under test according to the ground truth database. At step 112, method 100 may conclude.

As used herein, the term "cellular field testing tool" generally refers to a tool that helps to test, when a device under test is connected to a cellular base station and/or a cellular network, one or more attributes of performance and/or cellular network connectivity provided to the device under test. In other words, the cellular field testing tool generally tests how well the device under test performs (or how well the network performs) when connected, and configured, in accordance with a particular configuration at a particular location. Cellular network carriers may be requested to, or required to, satisfy one or more specifications when smartphones and/or other items of user equipment are connected to cellular networks. To help ensure that the cellular network carriers satisfy these particular specifications, the cellular field testing tool can be used to connect to a device under test and then check or verify that the device under test is actually achieving cellular network connectivity that satisfies one or more corresponding performance metrics, which may include dozens or even hundreds of such performance metrics. In some examples, a cellular field testing tool may correspond to (or include) a radio frequency drive testing tool, as that term is used by those having skill in the art.

Despite the above, some cellular field testing tools can suffer from one or more deficiencies or sub-optimizations and these tools may, therefore, benefit from one or more improvements, including improvements that automate one or more procedures that assist a user with operating the tool. These improved cellular field testing tools can, therefore, enable employees, contractors, and/or administrators of the cellular network carriers to appropriately operate these tools even if the administrators lack a degree of experience, sophistication, and/or detailed education regarding the performance and operation of the tools. In other words, automated improvements for the cellular field testing tools can enable less sophisticated operators to operate the tools in a more streamlined and/or user-friendly manner. Consequently, these improvements can furthermore reduce a burden on the carriers of training and/or educating these operators, while further increasing a potential pool of candidate operators for carrying out these testing procedures, as discussed in more detail below.

Similarly, as used herein, the term "precondition" can generally refer to one or more conditions that must be satisfied prior to the starting of a specific and corresponding cellular field testing tool test. Generally speaking, these preconditions refer to contextual preconditions that help to establish that the cellular field testing tool, when operating, will perform successfully and obtain results that are valid and useful (see the discussion of FIG. 3 below). Accordingly, the term "precondition," as used herein, generally does not refer to universal software preconditions that would generally apply even outside of the context of cellular field testing tools. For example, the term "precondition," as used herein, will generally not refer to a requirement to powering on the computing device executing the cellular field testing tool, in view of the fact that such a precondition would generally apply to all software even outside of the context of cellular field testing tools.

As used herein, the term "set" can generally refer to a collection of at least one precondition, unless indicated otherwise. Generally speaking, such cellular testing tools may benefit from checking or verifying a larger multitude of preconditions, as discussed in more detail below.

Figure 2:
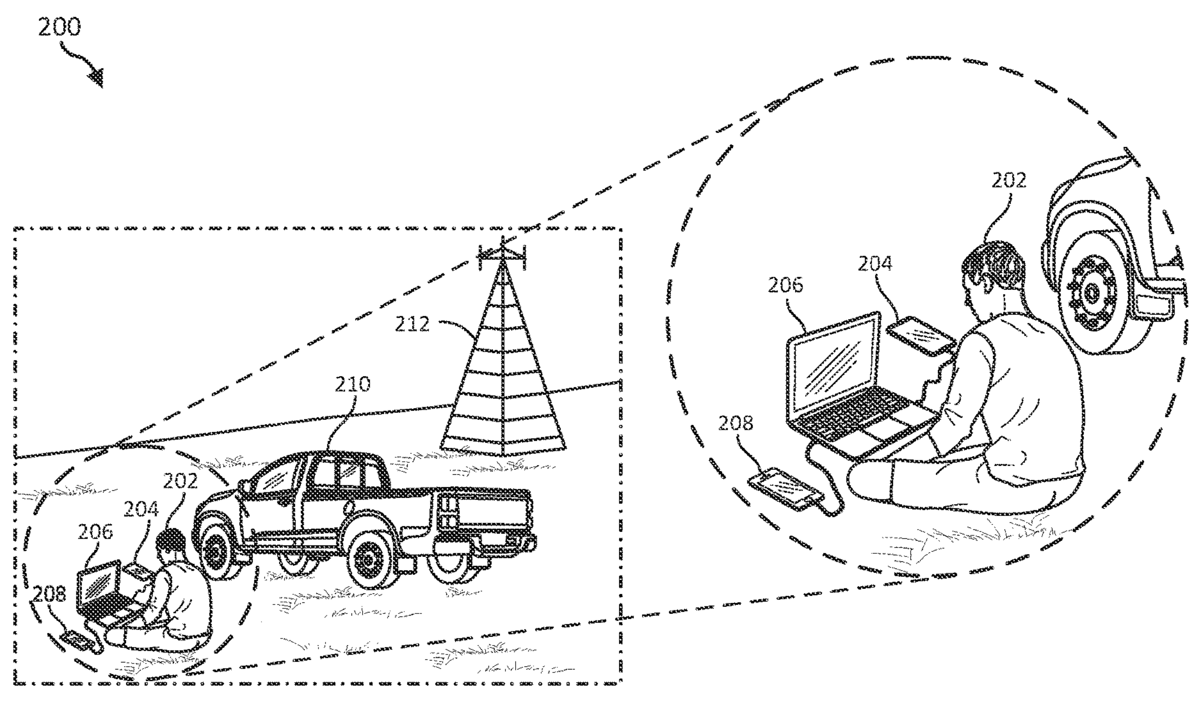
FIG. 2 shows a user operating a cellular field testing automation tool.

FIG. 2 shows an illustrative diagram 200 that helps to establish a context in which the methods described herein may be performed. As further shown in this diagram, a user or operator 202 may execute a cellular field testing tool on an item of user equipment or a computing device, such as a laptop 206. At the same time, the user may connect to additional computing devices and/or items of user equipment, such as a smartphone 204 and/or smartphone 208. In some examples, smartphone 204 may correspond to a device under test, where a smartphone 208 may correspond to a reference device (e.g., a device that may have been previously tested and/or verified as operating within specifications), or vice versa. For completeness, diagram 200 also illustrates how user 202 may have driven a truck 210 to a remote area at a particular location, where the user may establish cellular network connectivity with a cellular base station 212.

Figure 3:
FIG. 3 shows example preconditions that can be checked prior to enabling a user to operate the cellular field testing automation tool.
Figure 3:
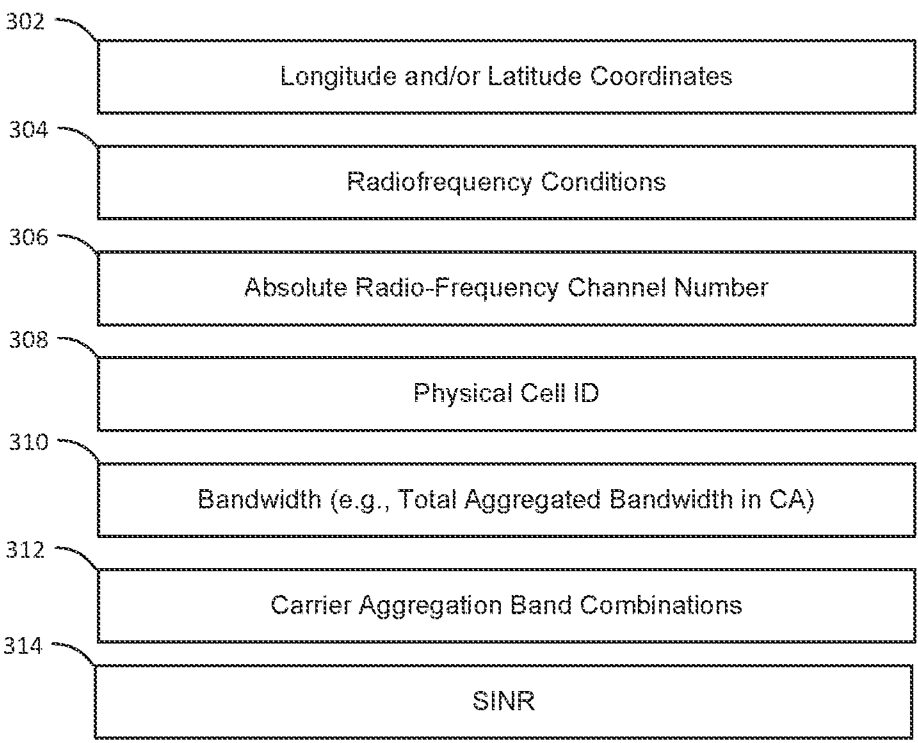

FIG. 3 shows a helpful list 300 of illustrative examples of preconditions that can be checked. Precondition 302 includes longitude and/or latitude coordinates. For example, this may involve verifying that the device under test and/or the reference device (which can generally be co-located as shown in FIG. 2) are sufficiently close to, or located within, particular geolocation coordinates or perimeters. Precondition 304 includes radiofrequency conditions. Illustrative examples of such aerial frequency conditions may include one or more of the following values or measurements: Reference Signal Received Power (RSRP), Reference Signal Received Quality (RSRQ), and/or Signal to Interference plus Noise Ratio (SINR). Other illustrative examples of radio frequency conditions, which may be more or less applicable or relevant, in various embodiments, than those listed above, may further include Received Signal Strength Indicator (RSSI), Signal to Noise plus Interference Ratio (SNIR), Signal to Noise Ratio (SNR), Arbitrary Strength Unit (ASU), and/or Signal to Noise Ratio (RS SINR or RSSNR).

Returning to FIG. 3, precondition 306 may include an Absolute Radio-Frequency Channel Number (ARFCN). This particular value may refer to a unique number given to each radio channel in a Global System for Mobile Communications (GSM) cellular network. Precondition 308 may refer to a physical cell ID. As illustrated in FIG. 2, the device under test and/or the reference device may be connected to a computing device, such as a laptop, that executes the cellular field testing tool. These connections may be wired or wireless, and wired connections may be formatted to conform with the PCI protocol, USB protocol, Bluetooth, etc. Helping to ensure proper connections to the computing device that is executing the cellular field testing tool helps to ensure that, when the tool executes a specific test, the corresponding connection with the device under test and/or reference device is appropriately established to successfully interface with the logging tool to collect upload and download packets sent and received from the device under test and/or the reference device. Precondition 310 may refer to the total, aggregated bandwidth of both the device under test and the reference device, if carrier aggregation (CA) is applicable, to ensure that the device under test and the reference device are conducted under the same network conditions. Lastly, precondition 312 can refer to carrier aggregation cell combinations. As understood by those having skill in the art, some cellular network carriers can aggregate portions of spectrum and/or their cellular networks (e.g., for roaming purposes, etc.). Precondition 312 may help to check and verify that both the device under test and the reference device have the same band configurations aggregated prior to the beginning of performing one or more specific tests by the cellular field testing tool. Precondition 314 can refer to Signal to Interference and Noise Ratio (SINR).

Figure 4:
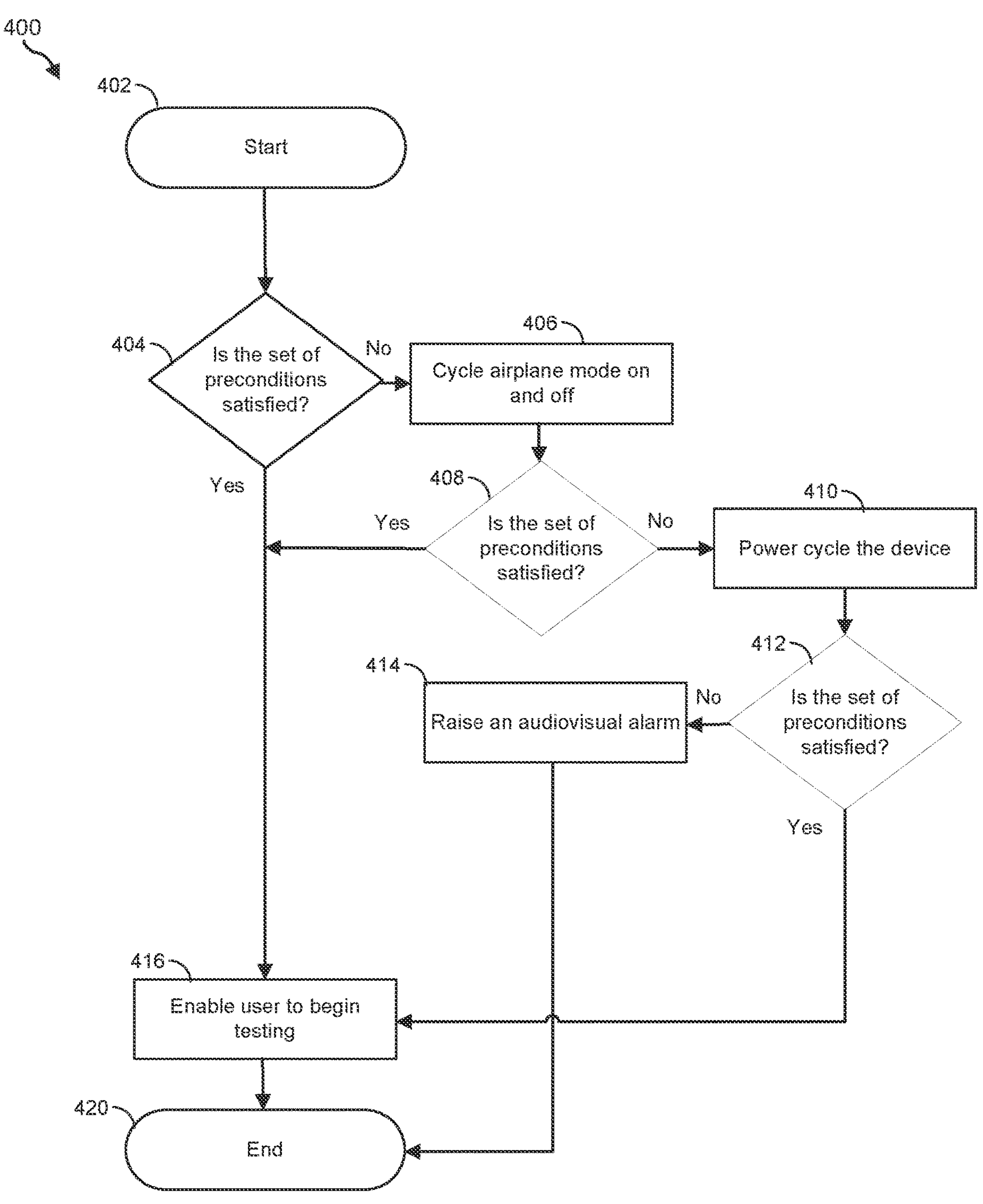
FIG. 4 shows another flow diagram for a method performed by a cellular field testing automation tool.

FIG. 4 shows a flow diagram for an example method 400 relating to operation of the cellular field testing tool. Method 400 helps to illustrate how, when checking for whether preconditions are satisfied, embodiments described herein may perform a series of different remedial actions in response to detecting that the preconditions are actually not satisfied. In some examples, the series of remedial actions may be increasingly staggered in terms of seriousness or severity, as discussed further below. The example of method 400 includes a series of three separate and staggered remedial actions (see step 406, step 410, and step 414). Although this example focuses on a set of three remedial actions, any suitable number or arbitrary number of remedial actions may be performed, in a parallel manner, as understood by those having skill in the art, with the goal of eventually achieving the successful satisfaction of all the preconditions. Moreover, although this example focuses on checking the exact same set of preconditions at each stage of the staggered process, in other examples the exact number or identity of the members of the set of preconditions may vary, slightly or more than slightly, between the different stages of the staggered process.

At step 402, method 400 may begin. At decision step 404, method 400 may perform a first check of whether the set of preconditions is satisfied. If the answer is yes at decision step 404, then method 400 may proceed to step 416, at which point method 400 may enable the user to begin a specific test, as discussed in more detail below. Alternatively, if the answer is no at decision step 404, then method 400 may proceed to step 406, at which point method 400 may cycle airplane mode on and off the specific device that is failing the preconditions (e.g., the device under test and/or the reference device).

From step 406, method 400 may proceed to decision step 408, which may correspond to the second stage of a staggered series of stages of testing whether the overall set of preconditions has been satisfied. In particular, at decision step 408, method 400 may check for the second time whether the set of preconditions has been satisfied. If the answer is no at decision step 408, then method 400 may proceed to step 410, at which point method 400 may power cycle the device that is failing the preconditions. Alternatively, again, if the answer is yes at decision step 408, then method 400 may proceed to step 416, at which point method 400 may enable the user to begin a specific test.

Lastly, as a third stage of method 400, at decision step 412, method 400 may again check whether the set of preconditions has been satisfied. If the answer is yes at decision step 412, then method 400 may proceed to step 416 again, at which point method 400 may enable the user to begin a specific test. Alternatively, if the answer is no at decision step 412, then method 400 may proceed to step 414, at which point method 400 may raise an audio and/or visual alarm to the user (see also the discussion of FIG. 14 below). At step 420, method 400 may conclude.

Figure 5:
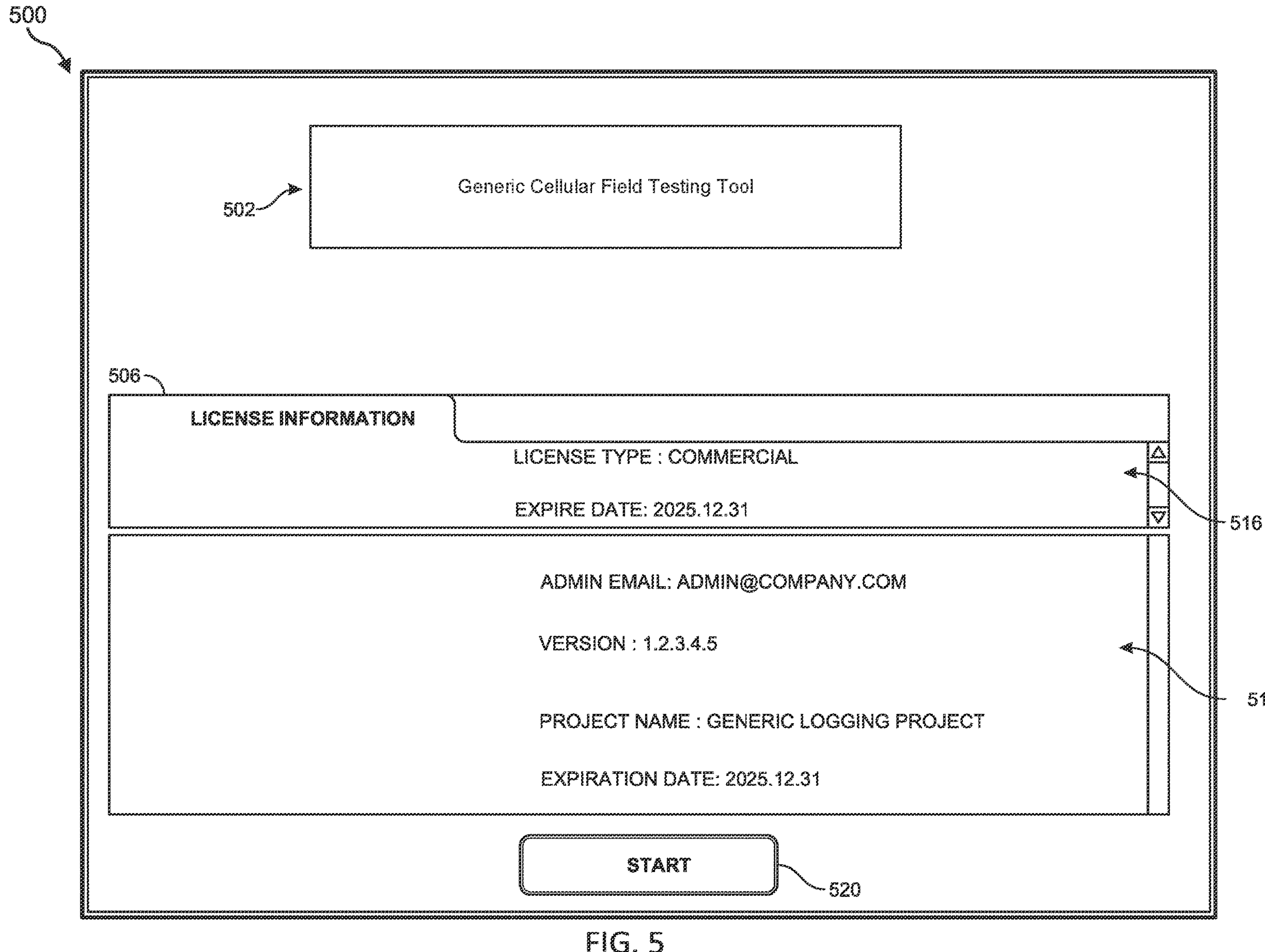
FIG. 5 shows an example introductory screen of a graphical user interface of the cellular field testing automation tool.

FIG. 5 shows a diagram 500 for an introductory screen of a graphical user interface for a cellular field testing tool that can be operated in accordance with method 400. As further shown in diagram 500, this introductory screen may include a headline 502 that indicates the name of the particular cellular field testing tool and/or software development company providing such a tool. In the simplified example of this figure, headline 502 indicates a generic name of "Generic Cellular Field Testing Tool." A graphical user interface element 506 may indicate license information. A window 516 may further provide information about the corresponding license, including its type and/or expiration date. Below that, a window 518 may further provide information about contacting a corresponding cellular network carrier ("company") that may be licensing and/or operating the corresponding software, as well as indications of a version of the software, a project name, and/or an expiration date of the license.

Figure 6:
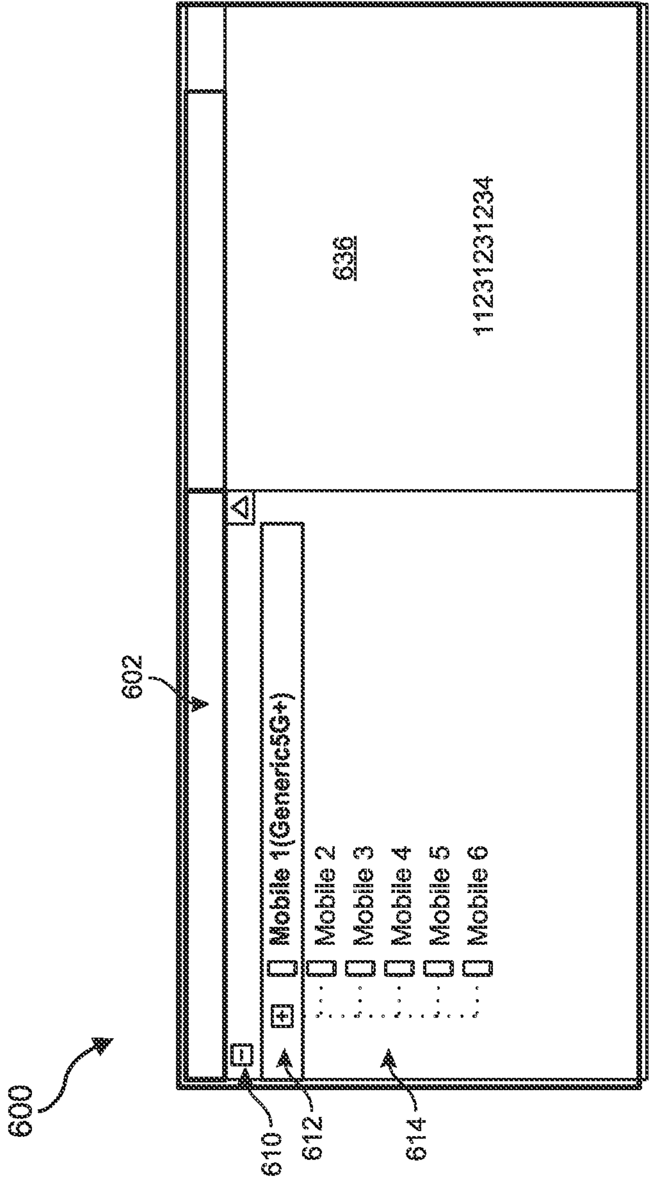
FIG. 6 shows an example screen of the graphical user interface of the cellular field testing automation tool.

FIG. 6 shows a diagram 600 of a screen of the same graphical user interface that may be presented as a result of selecting a button 520 (see FIG. 5) for starting execution of the corresponding cellular field testing tool. As further shown in diagram 600, the graphical user interface may include a devices list 602, and a drop-down menu 610 may indicate a list of mobile devices for testing. A graphical user interface element 612 may indicate the selection or connection of a specific mobile device ("Generic5G+" in this example). Moreover, a graphical user interface element 614 may further indicate a list of other candidate devices that may be selected or configured for testing. As further shown in this diagram, a portion 636 of diagram 600 indicates that the tool has connected to a particular phone number of the same mobile device corresponding to graphical user interface element 612.

Figure 7:
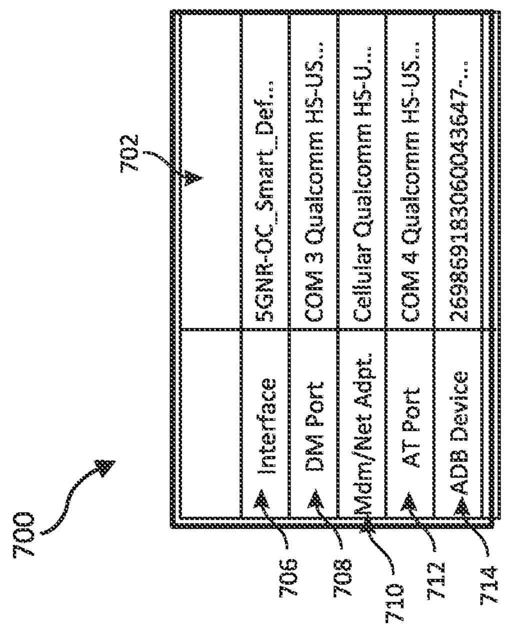
FIG. 7 shows an example screen of the graphical user interface of the cellular field testing automation tool.

FIG. 7 shows a diagram 700 of another screen of the same graphical user interface after the mobile device has been connected to initiate one or more specific tests. At this stage of operating the cellular field testing tool, the user or operator may toggle or configure one or more fields with values to set up specific testing procedures for each mobile device. Diagram 700 shows a portion 702 which corresponds to a connected mobile device of FIG. 6. A set of graphical user interface elements 706-714 show respective attributes or fields that the operator can toggle or configure to set up further testing procedures. In particular, as shown in this figure, the operator can configure, for each connected mobile device, an interface, a DM port (diagnostics and monitoring port), an MDM (Mobile Device Management) net adapter value, an AT port, and/or an Android Debug Bridge device value. In various examples, one or more of these values may be required to be configured to proceed with specific testing procedures. These examples of parameters that can be configured prior to beginning specific testing procedures are merely illustrative and, in other examples, additional or alternative parameters may be configured as appropriate.

Figure 8:
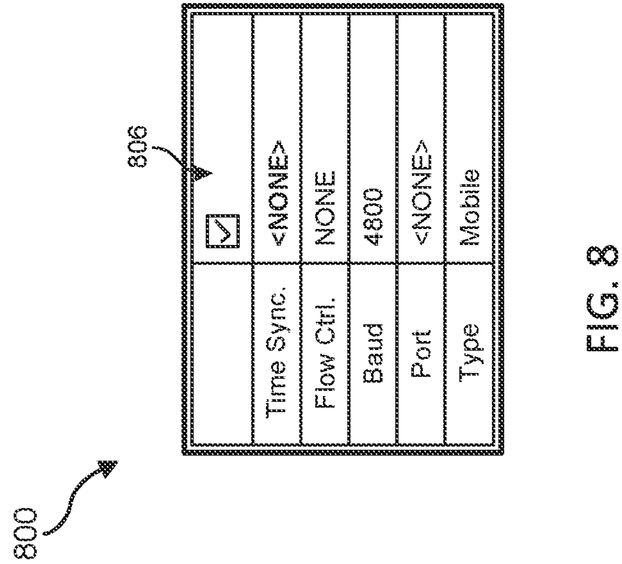
FIG. 8 shows an example screen of the graphical user interface of the cellular field testing automation tool.

FIG. 8 shows a diagram 800 that elaborates on a different aspect of the graphical user interface that was further shown as diagram 700. In particular, the corresponding diagram further illustrates how, prior to beginning specific testing procedures, the operator of the cellular field testing tool may toggle a Global Positioning System (GPS) field 806 to enable GPS functionality on one or more specific mobile devices that are under test.

Figure 9:
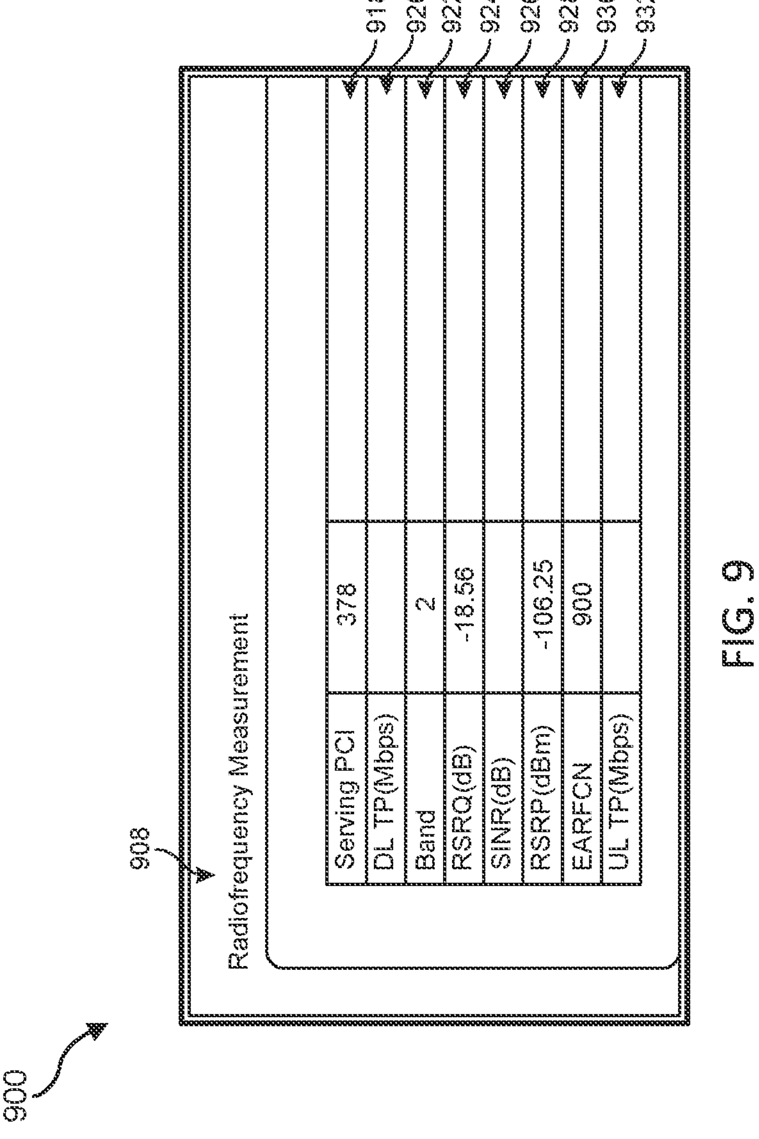
FIG. 9 shows an example screen of the graphical user interface of the cellular field testing automation tool.

FIG. 9 shows a diagram 900 of another screen of the graphical user interface of the cellular field testing tool. As further shown in this diagram, the graphical user interface can indicate to the operator one or more radiofrequency measurements and corresponding network connection attributes. A headline 908 may indicate "Radiofrequency Measurement." Rows 918-932 of diagram 900 may list respective measurement values relating to radiofrequency connectivity.

Figure 10:
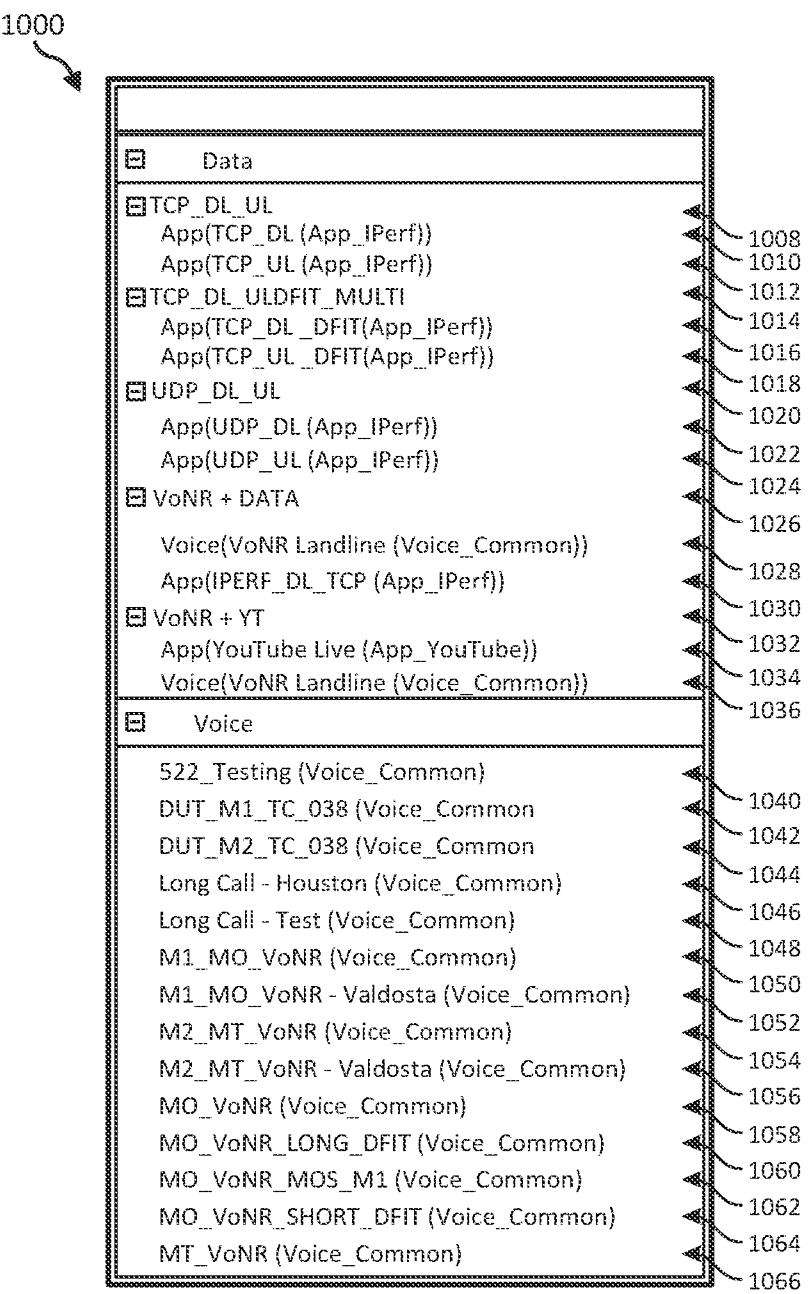
FIG. 10 shows an example screen of the graphical user interface of the cellular field testing automation tool.

FIG. 10 shows a diagram 1000 of another screen of the graphical user interface of the cellular field testing tool. As further shown in this figure, rows 1008-1066 may specify the names of different respective tests that the cellular field testing tool can perform, which can be user-customized, and these various specific tests may be categorized as either various different tests for testing data connections (see rows 1008-1036) and/or various different tests for testing voice connections (see rows 1040-1066).

Figure 11:
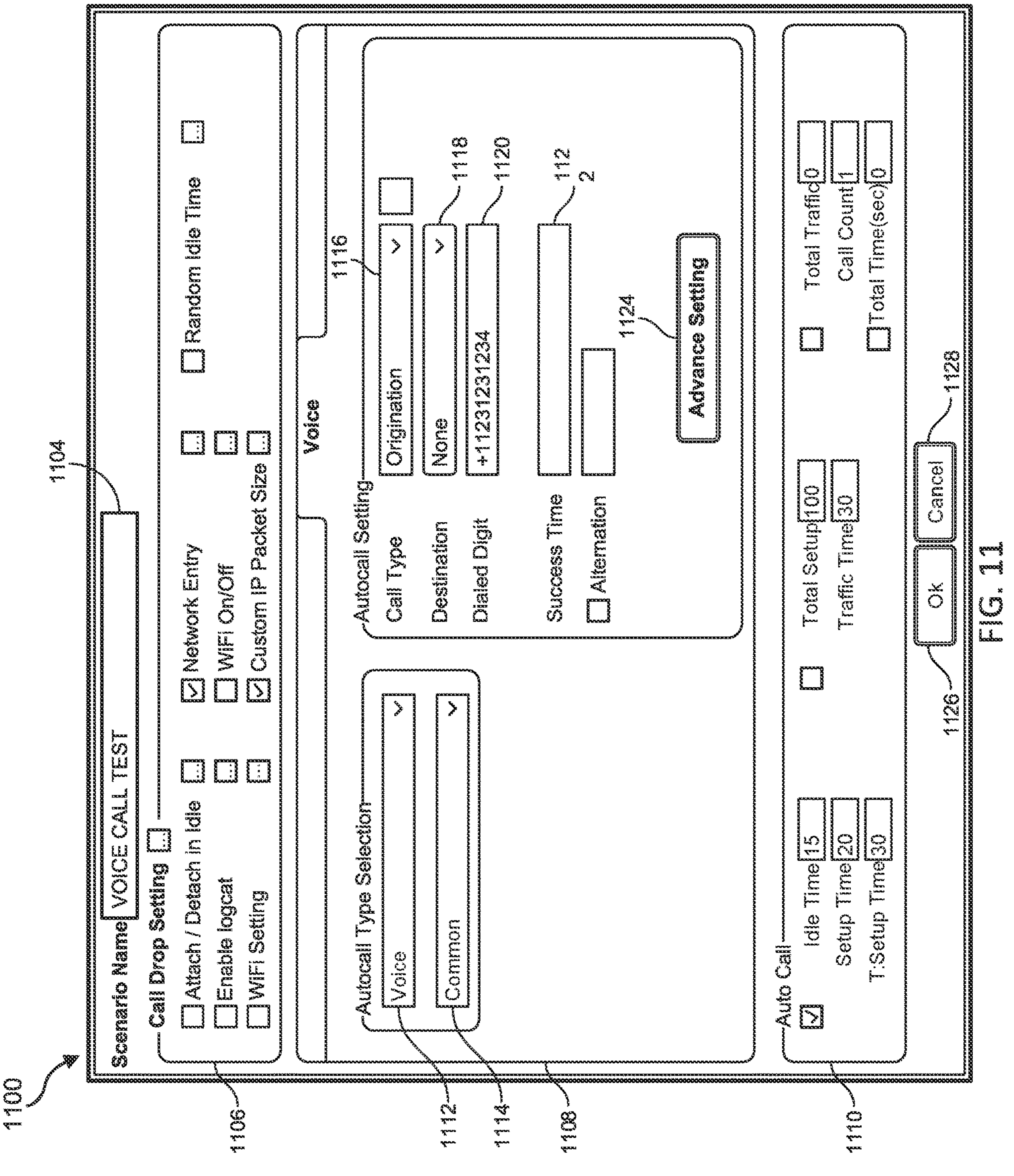
FIG. 11 shows an example screen of the graphical user interface of the cellular field testing automation tool.

FIG. 11 shows a diagram 1100 of another screen of the graphical user interface of the cellular field testing tool. As shown in this figure, diagram 1100 may include a scenario name 1104, as well as a panel 1106 of various fields or options that the operator can configure when setting up this particular test ("VOICE CALL TEST"). Another panel 1108 may further include a similar but distinct set of various fields or options that the operator can configure appropriately. Lastly, another panel 1114 may enable the user to further specify various values for another set of corresponding parameters as part of the configuration before initiating or executing the specific testing procedure. A button 1128 may enable the operator to cancel the current set of configuration procedures, and a button 1126 may enable the user to finalize configuration settings and proceed to the next stage of specific testing procedures.

Figure 12:
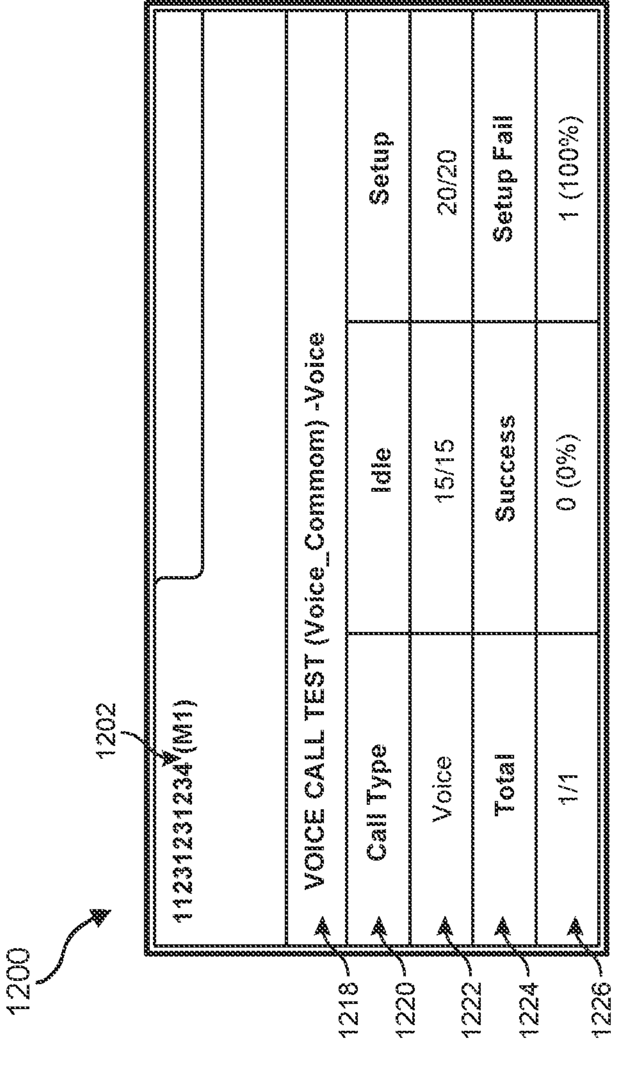
FIG. 12 shows an example screen of the graphical user interface of the cellular field testing automation tool.

FIG. 12 shows a diagram 1200 of another screen of the graphical user interface of the cellular field testing tool. An indicator 1202 may identify the phone number for the corresponding device under test. Generally speaking, the data displayed within the lower body of the window of diagram 1200 may display results, in real time, as one or more specific tests of the cellular field testing tool are being executed. In particular, a row 1220 and another respective row 1224 may display identifiers, within respective columns, to identify the type of resulting output information displayed in the rows that are immediately beneath these identifying rows. Thus, as further shown within diagram 1200, row 1222 may display values corresponding to the identifiers shown within row 1220, and row 1226 may display values corresponding to the identifier shown within row 1224. By way of illustrative example, row 1222 indicates that the call type (as indicated by row 1220) is "voice" within the same respective column.

Figure 13:
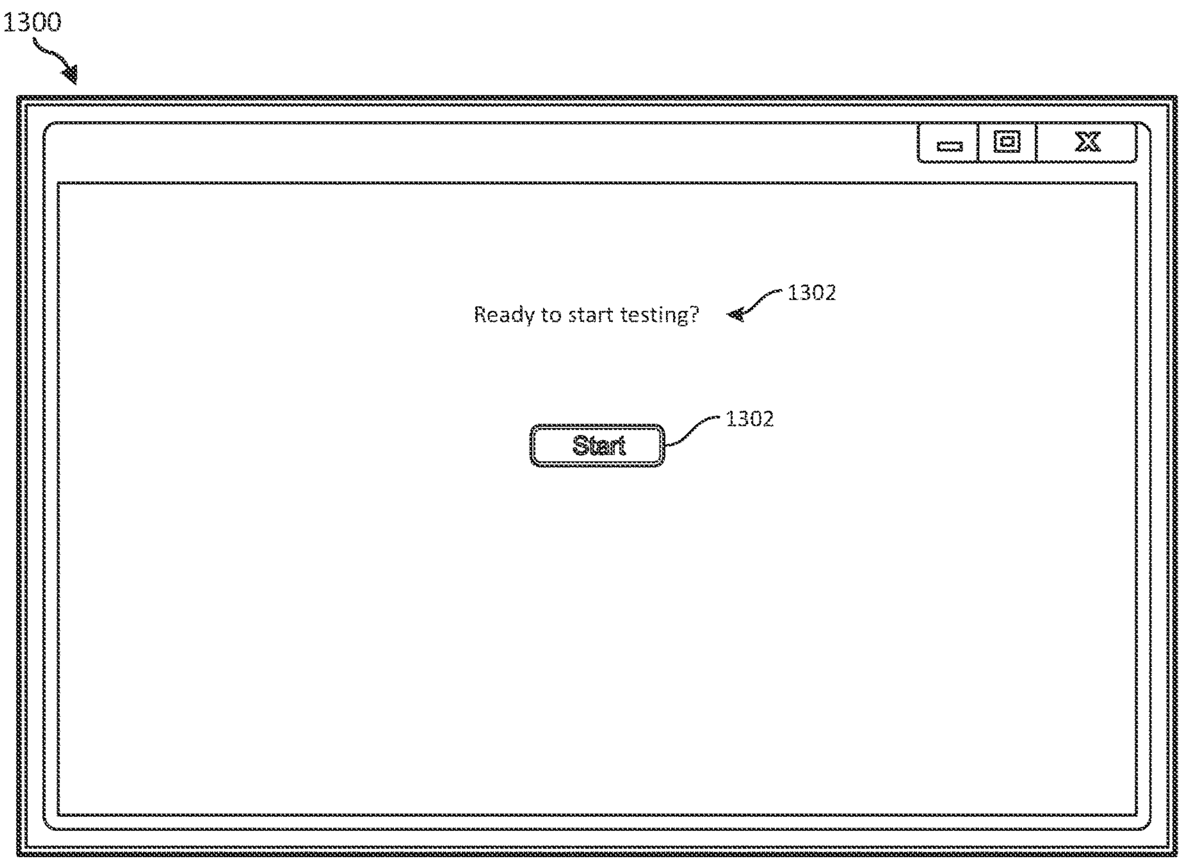
FIG. 13 shows an example screen of the graphical user interface of the cellular field testing automation tool.

FIG. 13 shows a diagram 1300 of a graphical user interface of the same cellular field testing tool that enables, or disables, the option for the operator to begin a specific test, including the specific tests that are identified or listed above by way of illustrative example. A prompt 1302 may inquire of the user whether the user is ready to begin testing procedures, after any one or more of the configuration and setup procedures that are outlined above have been performed, consistent with the discussion of FIGS. 5-12, for example. Graphical user interface element 1302, when this element is enabled, may allow the user to toggle the element and thereby finally begin specific testing procedures in accordance with the previous configuration and setup.

Nevertheless, as previously discussed above in connection with method 400, graphical user interface element 1302 and/or any suitable substitute for inputting information within the computing arts, may be disabled if the set of preconditions has not been satisfied. Thus, in various examples, graphical user interface element 1302 may be displayed in a "grayed out" manner such that, although the user can read a dimmer or grayer version of the "Start" text, attempting to toggle or select graphical user interface element 1302 may not result in any corresponding functionality. In other words, when not enabled, graphical user interface element 1302 may simply correspond to essentially frozen pixels that remain the same regardless of whether the user attempts to toggle them or not. Those having skill in the art will readily understand that any other suitable mechanism for disabling an input mechanism or graphical user interface button may be used to achieve essentially the same purpose of preventing the user from beginning a specific test procedure prior to the preconditions all being satisfied. Moreover, as soon as the preconditions are satisfied, perhaps after one or more stages of performing a series of remedial actions (see FIG. 4), graphical user interface element 1302 may be enabled such that the user can successfully toggle it to trigger the initiation of specific testing procedures.

As further discussed above, in some scenarios, even after performing a series of remedial actions (see the three remedial actions of FIG. 4), the set of preconditions may nevertheless remain unsatisfied. In that scenario, the computing device executing the cellular field testing tool may issue an alert to the user. In some related methodologies, there may be no such alert and/or the alert may be inconspicuous. Accordingly, this disclosure envisions alerts that are both conspicuous and audiovisual in nature such that the user receives will both an audio alert as well as a visual alert, thereby clearly bringing this information to the attention of the user.

Figure 14:
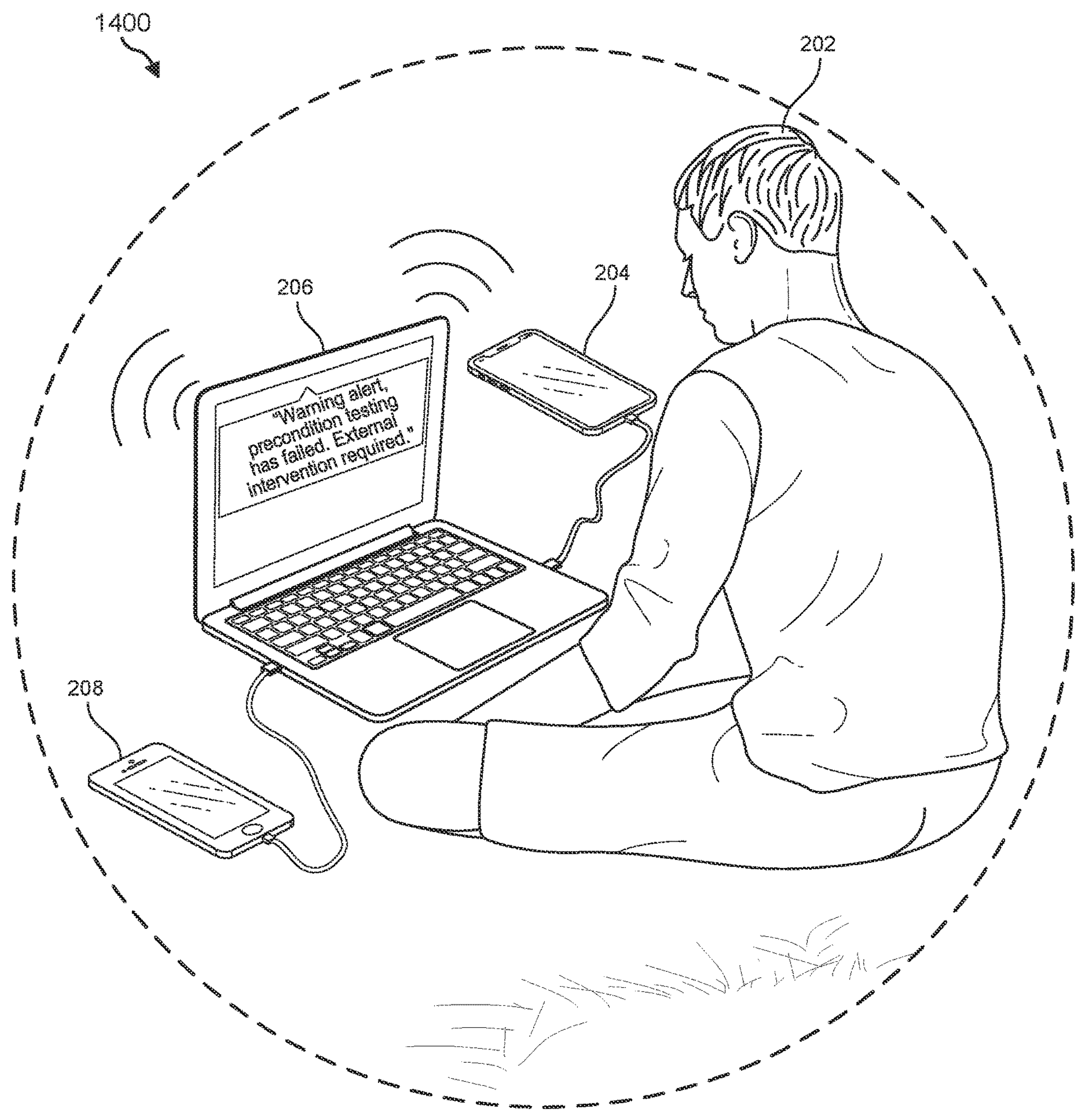
FIG. 14 shows a magnified view of the user operating the cellular field testing automation tool.

FIG. 14 shows a diagram 1400 of a magnified view of user 202 operating laptop 206 in connection with smartphone 204 and smartphone 208. As shown in this diagram, the visual alert may indicate to the user "Warning alert, precondition testing has failed. External intervention required." Those having skill in the art will readily ascertain that the particular text of this specific alert is merely an example for illustrative purposes and, in other examples, different variations and/or substitutes of such warnings may be used appropriately to notify the user.

The above discussion provides background contextual information regarding cellular field testing tools and/or radiofrequency drive testing tools, which can facilitate the reader's understanding when considering method 100 of FIG. 1. As first introduced above, method 100 can include (i) detecting, by a cellular field testing tool in response to a device under test making an emergency call, multiple location data structures that each provide respective indications of a location of the device under test, (ii) selecting, by the cellular field testing tool, a comparison location data structure from the multiple location data structures by applying a selection policy to the multiple location data structures, (iii) comparing, by the cellular field testing tool, the comparison location data structure to an identification of a location of the device under test according to a ground truth database, and (iv) outputting, by the cellular field testing tool, an indication of whether the device under test passes or fails a corresponding performance test based on comparing the comparison location data structure to the identification of the location of the device under test according to the ground truth database.

The technology of FIGS. 15-21 can help to address or resolve one or more of the following deficiencies. Within related radiofrequency drive testing tools and/or cellular field testing tools, no emergency 911, control plane position, or location accuracy analysis technology may exist. The only location information that such a tool may collect may be general location information from the global positioning system of an instance of user equipment, which can be required to be manually activated by a tester. In such scenarios, the tester may then have the option to transpose the global positioning system data of the user equipment onto an updated map to show the device's location throughout testing procedures. Even in such cases, however, there might be no collection of emergency location information or other information relating to, or required by, emergency regulatory rules.

As used herein, the term "emergency call" can refer to a call to a phone number that is directed to providing emergency support services. An illustrative example of such an emergency call may include a call to a 911 or other government emergency response phone number within the United States. In some examples, mobile devices such as smartphones may provide metadata or other information in tandem with the making of an emergency call. In particular, mobile devices may provide location information that indicates the particular or current location of the mobile device. The mobile devices may provide this information automatically in response to detecting that the users of the mobile devices are triggering or initiating emergency calls. In various examples, one or more government authorities may regulate or require cellular carriers, manufacturers, and/or other associated institutions to ensure that mobile devices perform emergency calls in a manner that satisfies one or more rules or provisions. For example, government authorities may establish regulations that require that the metadata or other information indicating the current location of the mobile device making an emergency call satisfies one or more metrics in terms of precision or accuracy, as discussed in more detail below. As used herein, the term "comparison location data structure" can generally refer to any software structure or element containing fields of information that describe or indicate location information useful for comparison purposes consistent with method 100, as further discussed below. By way of illustrative example, such a comparison location data structure can include a data structure that includes or associates together one or more of latitude coordinates, longitude coordinates, height or vertical coordinates, a street address, a state, a country, an area code, and/or a zip code, etc. So a particular data structure might correspond to "{geolocation coordinates: {longitude coordinate, latitude coordinate}}". As used herein, the term "ground truth database" can generally refer to a database of location information to which one or more other items of location information may be compared for the purposes of ascertaining accuracy, etc., as is also further discussed below. As used herein, the term "selection policy" can refer to any suitable policy for selecting between different location data structures consistent with the discussion of the various embodiments below. As used herein, the term "corresponding performance test" can refer to a performance test corresponding to the emergency call made by the device under test such that the performance of the device under test is evaluated in terms of how well the device under test reports location information for that emergency call. Moreover, in various examples performing method 100 may include automatically or autonomously enabling or activating the global positioning system of the user equipment, thereby obviating, in these examples, a requirement for a user of the cellular field testing tool to manually activate a global positioning system component of the device under test.

Figure 15:
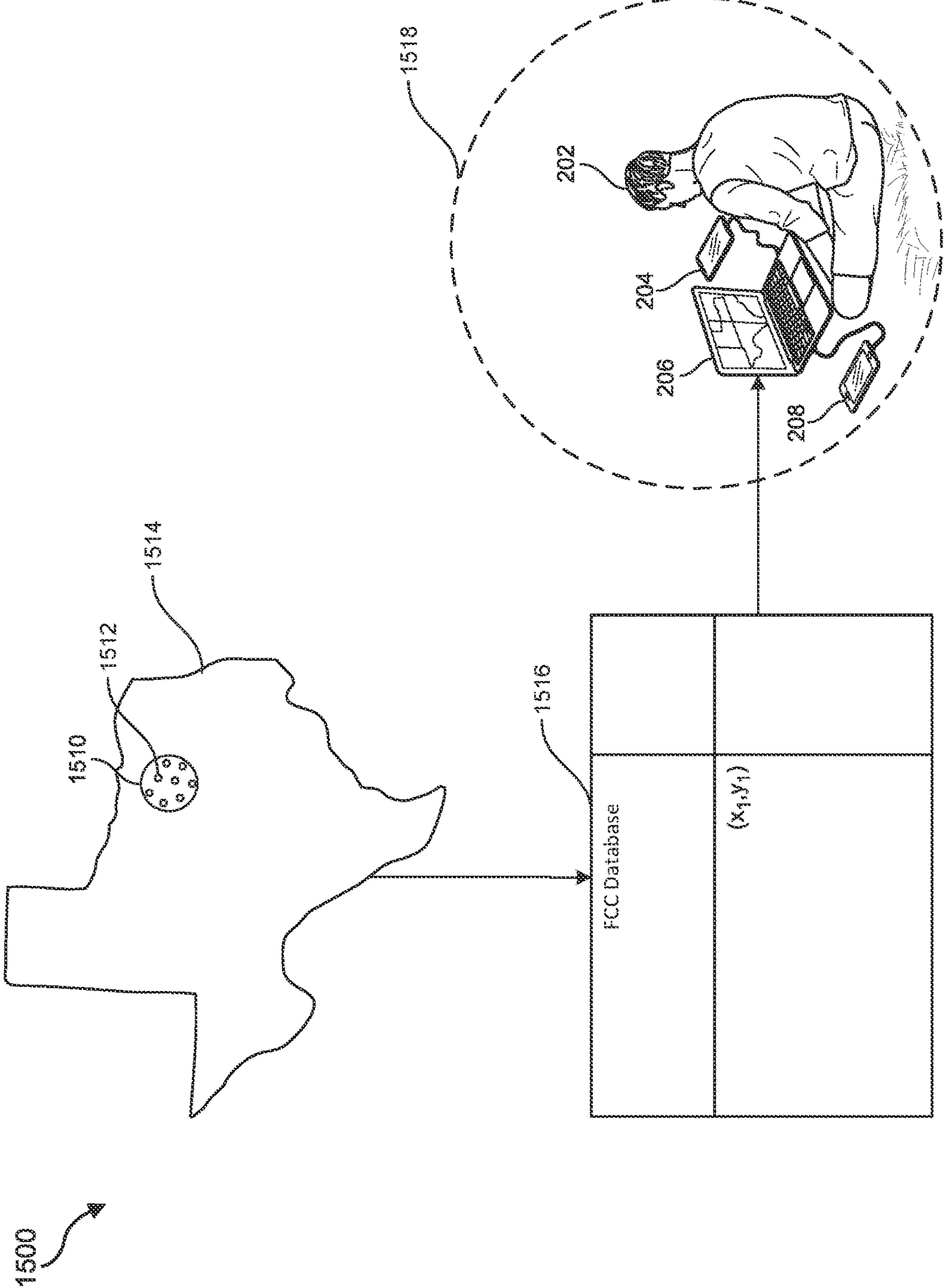
FIG. 15 shows a diagram of the relationship between a ground truth database and a user of a cellular field testing tool.

FIG. 15 shows a diagram 1500 that figuratively illustrates how a database, such as an FCC database 1516, may maintain ground truth information regarding specified locations around the United States, for example. In such an example, the ground truth database is derived from a regulatory authority (i.e., the FCC in this case). Moreover, diagram 1500 includes a sub-diagram 1514 of the state of Texas, which may further include a circle 1510 around the greater area of Dallas-Fort Worth. As further shown within diagram 1500, the area around Dallas-Fort Worth may further include dots, such as a dot 1512, that specify known and pre-existing locations that correspond to locations identified with a high degree of accuracy and precision within database 1516. Database 1516 may identify the particular locations on three different axes, including latitude, longitude, and/or vertical, for example. Accordingly, as shown within this figure, database 1516 may further include a vertical line and horizontal line intersecting a particular intersection point, which has been labeled as "(x1, y1)". Diagram 1500 also includes a reproduction 1518 of the earlier diagram from FIG. 2 in which the smartphone (device under test) 208 and the smartphone (reference device) 204 are connected to a laptop 206 executing a cellular field testing tool, which can be managed or operated by a user 202, as further discussed above. Accordingly, the smartphone 208 may ascertain and report one or more location data structures, which may each specify information identifying or indicating a current location of the device under test. These items of information may be compared by a cellular field testing tool executing at laptop 206 with one or more items of information within database 1516, which can constitute a ground truth database, and which may provide a more precise and/or more accurate indication of a particular location where the device under test is located.

Figure 16:
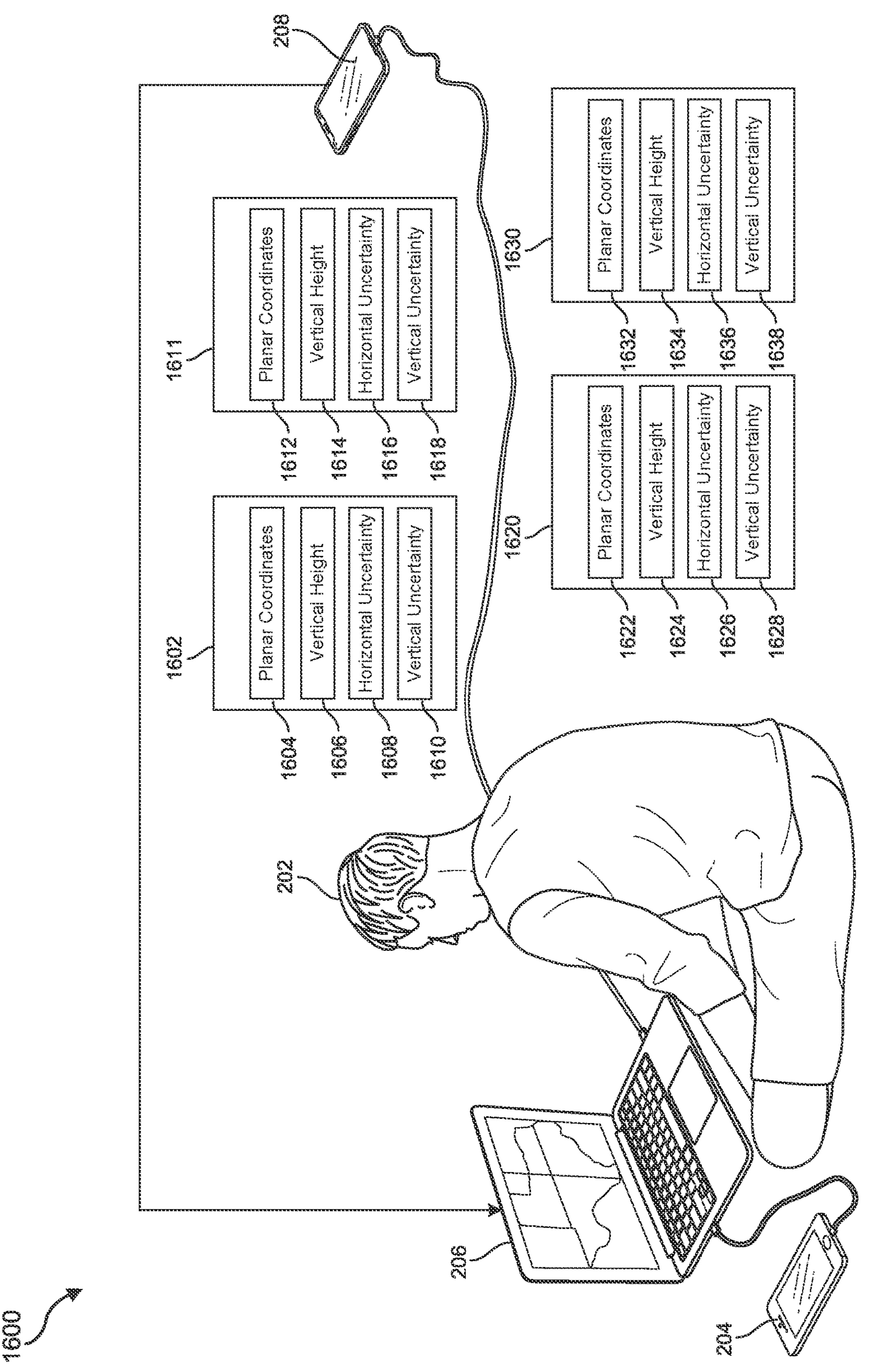
FIG. 16 shows a diagram of a device under test providing multiple location data structures to a cellular field testing tool.

FIG. 16 shows a diagram 1600 that elaborates on, and expands upon, reproduction 1518 in a manner that further helps illustrate how the device under test may provide multiple different instances of location data structures to laptop 206 where the cellular field testing tool is executing. In particular, this figure shows the following instances of location data structures: a location data structure 1602, a location data structure 1611, a location data structure 1620, and a location data structure 1630. As further shown in this figure, each of these instances of location data structures may further specify data points 1604-1610, data points 1612-1618, data points 1622-1628, and data points 1632-1638, which may further indicate plane coordinates, a vertical height, a level of horizontal uncertainty, and/or a level of vertical uncertainty, respectively, for each one of the different location data structures.

Diagram 1600 reflects the practical reality that the device under test has multiple different components and/or methodologies for calculating, measuring, and/or reporting location data and/or coordinates. In addition to the standard global positioning system component of the device under test, the device under test may also have access to one or more other components or methodologies, such as a search engine or technology company API and/or control plane location information, etc. Generally speaking, the device under test may include a plurality of components or methodologies for calculating, measuring, and/or reporting location data or coordinates. In view of the above, when testing how well the device under test performs when making emergency calls and reporting location data (e.g., in order to satisfy one or more performance metrics and/or government regulations), it can be helpful to select or use less than all of the available sources of location information, such as by selecting a single or most accurate or most helpful source of location information for these purposes, as discussed in more detail below.

Figure 17:
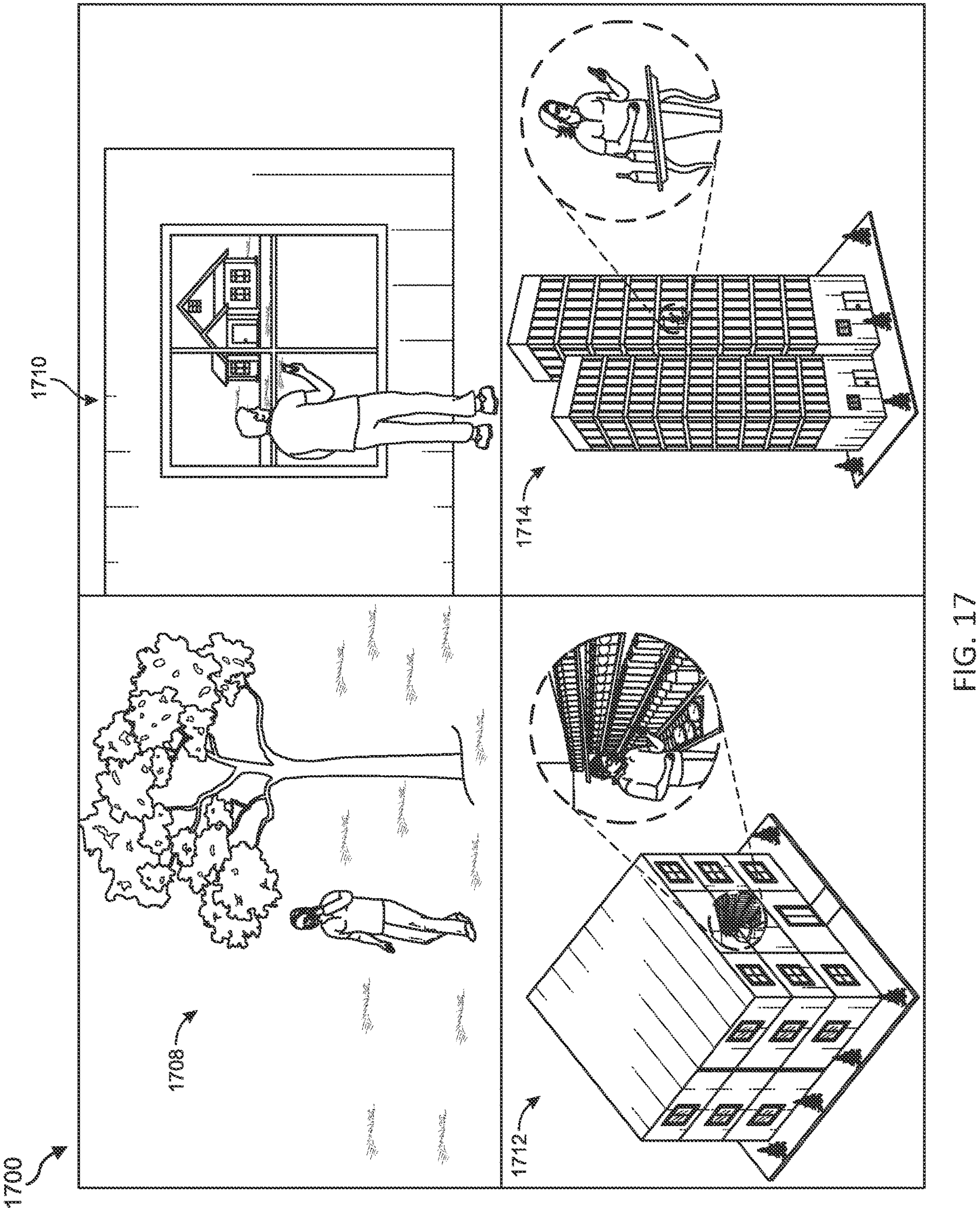
FIG. 17 shows a diagram of illustrative examples of different morphologies tested by the cellular field testing tool when a device under test makes emergency calls.

In some examples, the device under test may be tested within a plurality of different environments or morphologies in order to satisfy one or more regulations or requirements. FIG. 17 shows a diagram 1700 that further shows a sub-diagram 1708, a sub-diagram 1710, a sub-diagram 1712, and a sub-diagram 1714. Each of these respective sub-diagrams may correspond to a different one of the morphologies that may be tested when evaluating how well the device under test performs according to a cellular field testing tool. In particular, sub-diagram 1708 may correspond to an "open sky" morphology, sub-diagram 1710 may correspond to a "mild indoor" morphology, sub-diagram 1712 may correspond to a "deep indoor" morphology, and/or sub-diagram 1714 may correspond to a "N-th floor" morphology, as understood by those having skill in the art, and as may be specified in particular by one or more regulatory authorities. As further discussed above in connection with FIG. 15, a cellular field testing tool executing on a laptop operated by a user, such as an employee of a cellular service carrier, may receive two items of data for comparison purposes from two different sources, respectively: the device under test reporting from its own measurements its current location and a ground truth database that establishes a more accurate or more established location where the device under test is actually located. The cellular field testing tool may compare these two items of information, for each one of the different morphologies, in accordance with method 100 and/or method 2100, as discussed in more detail below.

Figure 18:
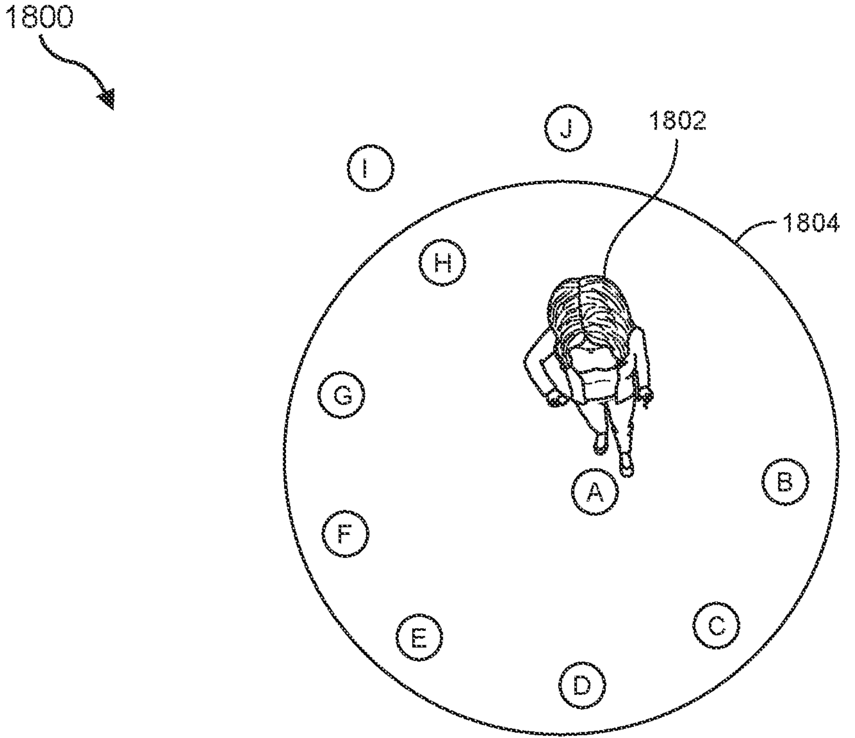
FIG. 18 shows a diagram illustrating how the cellular field testing tool may evaluate how well the device under test ascertains horizontal location information.

FIG. 18 shows a diagram 1800 of a user 1802 as well as instances of reported locations where the user has attempted to make emergency calls. These respective instances of reported locations have been labeled A-J. As further shown within this figure, user 1802 can be located at a ground truth center point within a circle 1804 defined by a radius of a corresponding performance test policy. As one illustrative example, the radius may be specified by the cellular field testing tool and/or the radius may be specified by a regulation established by one or more authorities, such as government authorities, to indicate performance criteria for mobile devices. Although not drawn to scale within this figure for purposes of simplicity, an example radius corresponding to circle 1804 may be 50 meters, for example. Diagram 1800 further illustrates how 80% of the instances of reported locations where the user has attempted to make emergency calls are located within circle 1804 (see A-H in diagram 1800). In contrast, diagram 1800 also further illustrates how two remaining instances of the reported locations where the user has attempted to make emergency calls are located outside of circle 1804 (see I-J in diagram 1800). Accordingly, in this example 80% of the instances of reported locations satisfy a radius threshold of 50 meters, as further discussed above, which can satisfy a regulation requiring 80% or greater of such calls within a series of attempted calls as part of a performance test to satisfy the radius threshold. Those having skill in the art can ascertain that the relevant percentage (e.g., 80%) and/or the relevant radius (50 meters) are merely illustrative and, additionally or alternatively, in other examples different values for one or both of these may be used in other embodiments in any suitable manner that achieves the intended purposes and/or benefits of method 100, as further discussed above.

Figure 19:
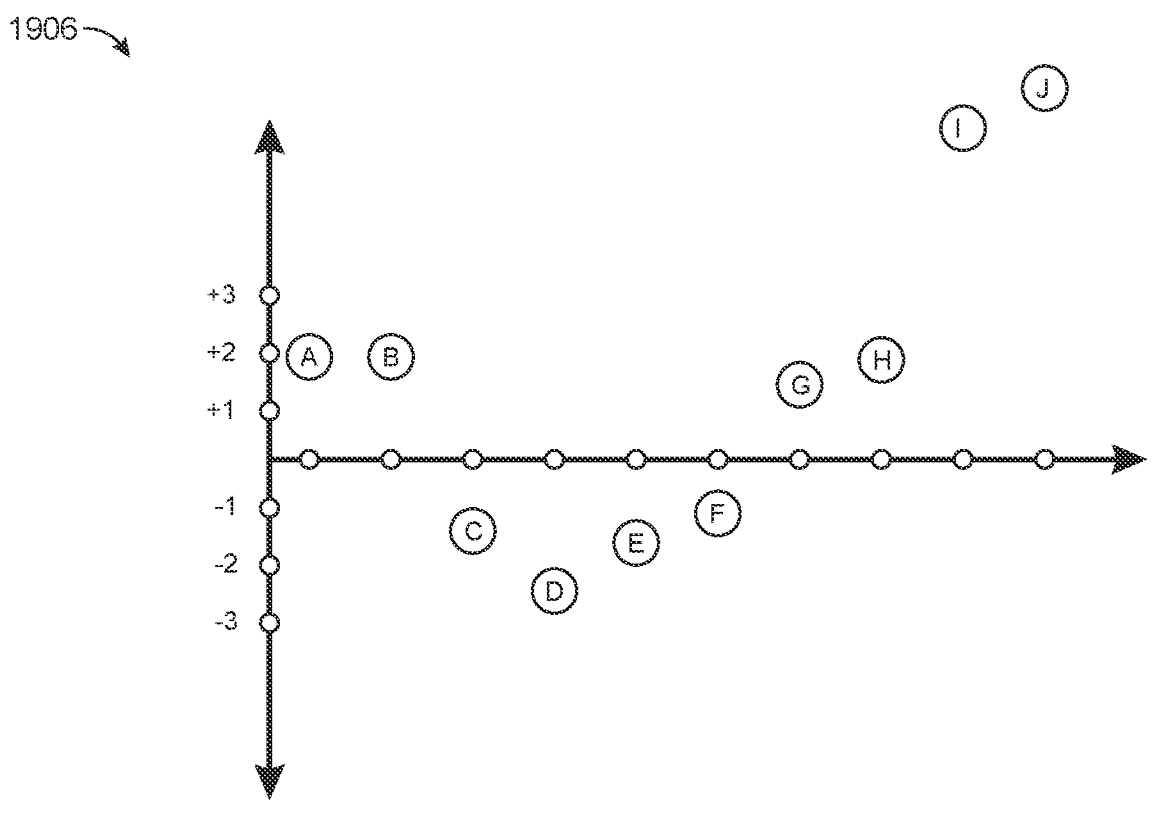
FIG. 19 shows a diagram illustrating how the cellular field testing tool may evaluate how well the device under test ascertains vertical location information.

In contrast, FIG. 19 further shows a diagram 1906 for the same instances of reported locations A-J, but diagram 1906 shows vertical height information rather than planar coordinates within a horizontal radius, as discussed above in connection with FIG. 18. As further shown in this figure, reported locations A-H fall within three meters, plus or minus, from a ground truth vertical height of the device under test, as verified or ascertained by using a ground truth database such as database 1516. In contrast, reported locations I-J fall outside of this threshold distance. Accordingly, in both FIG. 18 and FIG. 19, reported locations I-J fail the desired threshold metric in terms of a horizontal distance and/or a vertical height distance. Nevertheless, in both of these figures, 80% of the reported locations satisfy both of these metrics and, therefore, satisfy the corresponding overall performance test, which may be specified by the cellular field testing tool and/or by a regulation established by an authority such as a government authority. In this example, such a regulation may require both the horizontal and the vertical thresholds to be satisfied 80% of the iterations within a series of tested iterations, but in other examples any suitable combination or permutation of metrics or tests may be applied according to a policy in a manner that achieves the intended purposes or benefits of method 100, as further discussed above.

Figure 20:
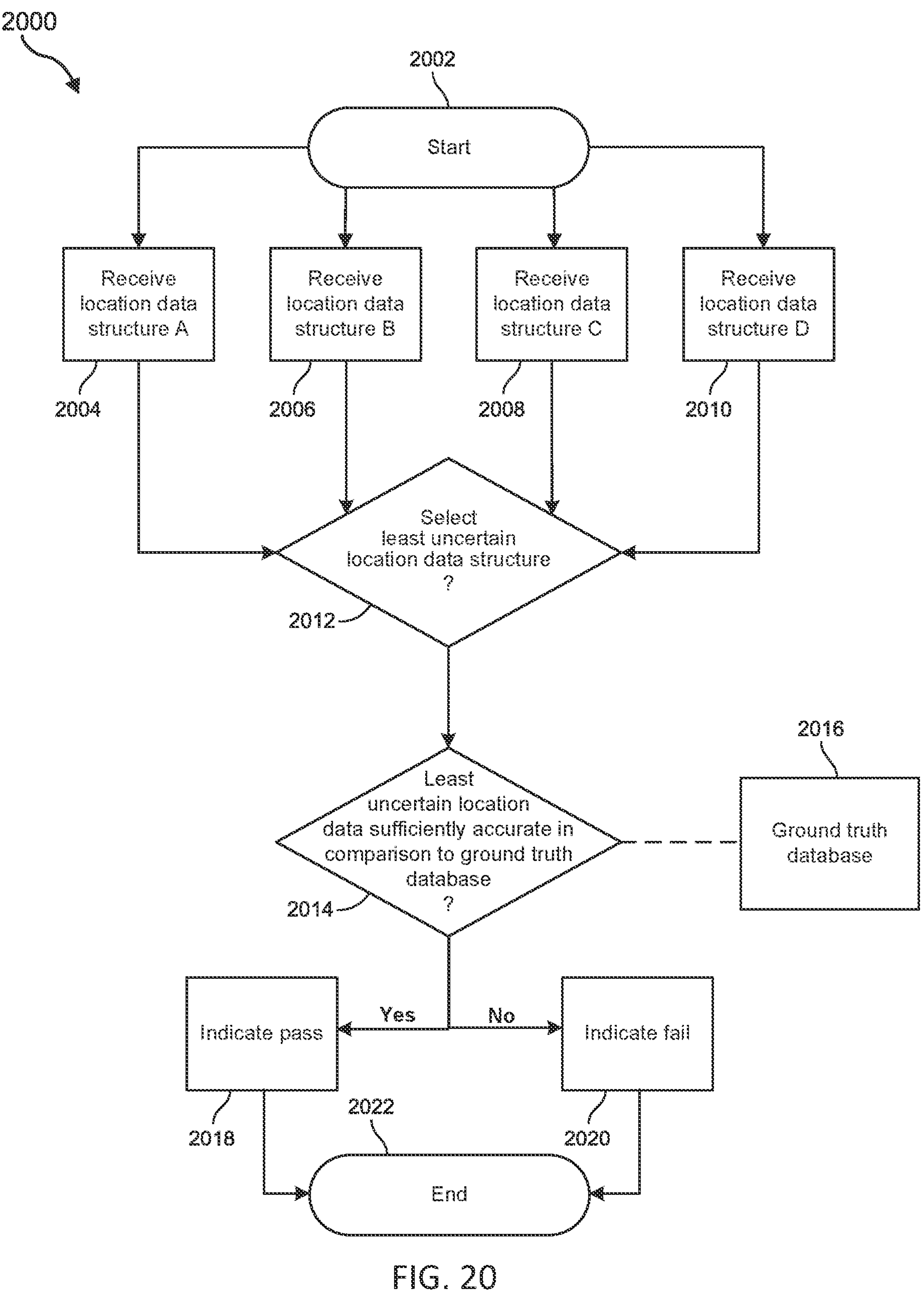
FIG. 20 shows a flow diagram for an example method to be performed by a cellular field testing tool in order to evaluate how well the device under test ascertains and reports location information in response to making an emergency call.

FIG. 20 shows a flow diagram for a method 2000 that corresponds to a detailed implementation or embodiment of method 100. As further shown within this figure, method 2000 may begin at a step 2002. From step 2002, method 2000 may proceed to step 2004-2010, at which point four different location data structures may be received, as further discussed above in connection with FIG. 16. The example of four different location data structures is used for illustrative purposes within this figure, but in other examples any other suitable number of different location data structures and/or corresponding methodologies for ascertaining location data may be used, as understood by those having skill in the art. In the particular example of this figure, the four different location data structures may be received simultaneously and/or in series, for example.

Upon or after receiving the four location data structures, method 2000 may proceed to a decision step 2012, at which point a cellular field testing tool may select which one of the four different location data structures has the least level of uncertainty. In some examples, each of the respective location data structures may only specify a single value or number indicating uncertainty, in which case the cellular field testing tool may select the location data structure that specifies the lowest value or number. In other examples, each of the respective location data structures may specify both a horizontal uncertainty level and a vertical uncertainty level, consistent with FIG. 16. In such scenarios, any particular location data structure may have a lower level of uncertainty along one dimension, such as the horizontal dimension, while nevertheless having a higher level of uncertainty along the remaining dimension, such as the vertical dimension. Accordingly, it may not be always straightforward to select the location data structure that has, overall, the least level of uncertainty. For this reason, the cellular field testing tool may apply any suitable or configured or desired policy to select the most desired or appropriate or otherwise optimal location data structure, from among multiple data structures, in a manner that seeks to reduce the overall level of uncertainty. Furthermore, such a policy may produce an overall estimate or measurement of uncertainty based on a combination of horizontal uncertainty and/or the vertical uncertainty as inputs. Additionally, or alternatively, the policy may apply different weights to the horizontal uncertainty and/or the vertical uncertainty, as desired or appropriate.

Upon selecting the best, most appropriate, most desired, or least uncertain location data structure at decision step 2012, method 2000 may proceed to decision step 2014, at which point the cellular field testing tool may evaluate or ascertain whether the least uncertain location data structure is sufficiently accurate in comparison to a ground truth database 2016, as discussed above in connection with FIG. 15, for example. The level of sufficient accuracy may be ascertained by referencing a threshold delta, for example, such that the reported location is found within that delta of the ground truth location. If the decision is yes at decision step 2014, then method 2000 may proceed to a step 2018, at which point the cellular field testing tool may indicate a pass for the device under test. Alternatively, if the decision is no at decision step 2014, then method 2000 may proceed to a step 2020, at which point the cellular field testing tool may indicate a fail for the device under test. Subsequently, at step 2022, method 2000 may end.

Figure 21:
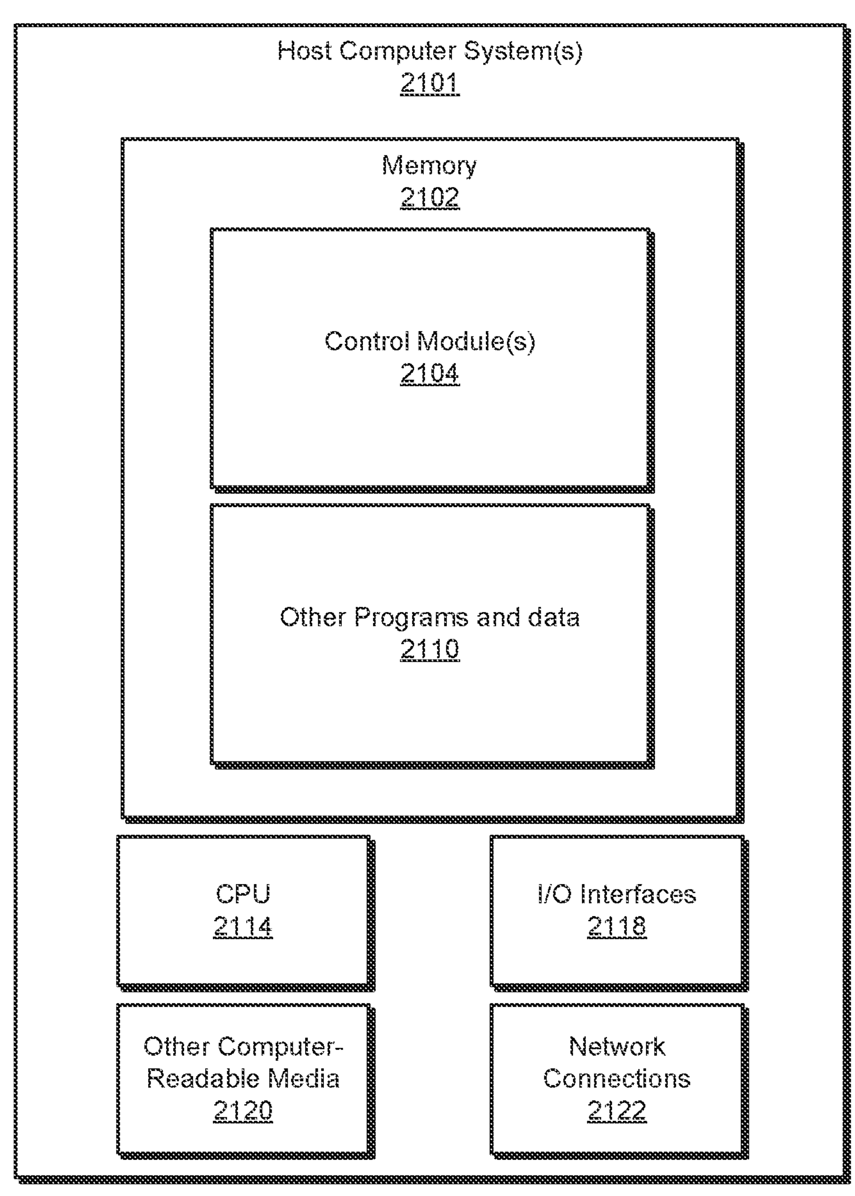
FIG. 21 shows a diagram of an example computing system that may facilitate the performance of one or more of the methods described herein.

FIG. 21 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 21 illustrates an example of underlying hardware on which such software and functionality may be hosted and/or implemented.

In particular, shown is example host computer system(s) 2101. For example, such computer system(s) 2101 may execute a scripting application, or other software application, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 2101 may include memory 2102, one or more central processing units (CPUs) 2114, I/O interfaces 2118, other computer-readable media 2120, and network connections 2122.

Memory 2102 may include one or more various types of non-volatile and/or volatile storage technologies. Examples of memory 2102 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 2102 may be utilized to store information, including computer-readable instructions that are utilized by CPU 2114 to perform actions, including those of embodiments described herein.

Memory 2102 may have stored thereon control module(s) 2104. The control module(s) 2104 may be configured to implement and/or perform some or all of the functions of the systems or components described herein. Memory 2102 may also store other programs and data 2110, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 2122 are configured to communicate with other computing devices to facilitate the functionality described herein. In various embodiments, the network connections 2122 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 2118 may include a video interface, other data input or output interfaces, or the like. Other computer-readable media 2120 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

detecting, by a cellular field testing tool in response to a device under test making an emergency call, multiple location data structures that each provide respective indications of a location of the device under test;

selecting, by the cellular field testing tool, a comparison location data structure from the multiple location data structures by applying a selection policy to the multiple location data structures;

comparing, by the cellular field testing tool, the comparison location data structure to an identification of a location of the device under test according to a ground truth database; and outputting, by the cellular field testing tool, an indication of whether the device under test passes or fails a corresponding performance test based on comparing the comparison location data structure to the identification of the location of the device under test according to the ground truth database;

wherein:

the selection policy selects the comparison location data structure at least in part by comparing an indication of horizontal and vertical uncertainty for the comparison location data structure with an indication of horizontal and vertical uncertainty for a distinct data structure within the multiple location data structures.

2. The method of claim 1, wherein the device under test comprises a smartphone.

3. The method of claim 1, wherein the selection policy selects the comparison location data structure at least in part by comparing the indication of horizontal and vertical uncertainty for the comparison location data structure with a respective indication of horizontal and vertical uncertainty for each remaining distinct data structure within the multiple location data structures.

4. The method of claim 1, wherein the ground truth database is derived from a regulatory authority.

5. The method of claim 1, wherein the performance test indicates whether the device under test satisfies a regulation.

6. The method of claim 5, wherein the regulation specifies a 50 meter tolerance for horizontal accuracy.

7. The method of claim 5, wherein the regulation specifies a three meter tolerance for vertical accuracy.

8. The method of claim 5, wherein the regulation specifies that a percentage of wireless calls during the performance test satisfies a horizontal tolerance and a vertical tolerance.

9. The method of claim 1, wherein the performance test obviates a requirement for a user of the cellular field testing tool to manually activate a global positioning system component of the device under test.

10. The method of claim 1, wherein the performance test measures performance of the device under test within at least two distinct morphologies.

11. A system comprising:

a physical computing processor; and a non-transitory computer-readable medium encoding instructions that, when executed by the physical computing processor, cause the physical computing processor to perform operations comprising:

detecting, by a cellular field testing tool in response to a device under test making an emergency call, multiple location data structures that each provide respective indications of a location of the device under test;

selecting, by the cellular field testing tool, a comparison location data structure from the multiple location data structures by applying a selection policy to the multiple location data structures;

comparing, by the cellular field testing tool, the comparison location data structure to an identification of a location of the device under test according to a ground truth database; and outputting, by the cellular field testing tool, an indication of whether the device under test passes or fails a corresponding performance test based on comparing the comparison location data structure to the identification of the location of the device under test according to the ground truth database;

wherein:

the selection policy selects the comparison location data structure at least in part by comparing an indication of horizontal and vertical uncertainty for the comparison location data structure with an indication of horizontal and vertical uncertainty for a distinct data structure within the multiple location data structures.

12. The system of claim 11, wherein the device under test comprises a smartphone.

13. The system of claim 11, wherein the selection policy selects the comparison location data structure at least in part by comparing the indication of horizontal and vertical uncertainty for the comparison location data structure with a respective indication of horizontal and vertical uncertainty for each remaining distinct data structure within the multiple location data structures.

14. The system of claim 11, wherein the ground truth database is derived from a regulatory authority.

15. The system of claim 11, wherein the performance test indicates whether the device under test satisfies a regulation.

16. The system of claim 15, wherein the regulation specifies a 50 meter tolerance for horizontal accuracy.

17. The system of claim 15, wherein the regulation specifies a three meter tolerance for vertical accuracy.

18. The system of claim 15, wherein the regulation specifies that a percentage of wireless calls during the performance test satisfies a horizontal tolerance and a vertical tolerance.

19. The system of claim 11, wherein the performance test obviates a requirement for a user of the cellular field testing tool to manually activate a global positioning system component of the device under test.

20. A non-transitory computer-readable medium encoding instructions that, when executed by at least one physical processor of a computing device, cause the computing device to perform operations comprising:

detecting, by a cellular field testing tool in response to a device under test making an emergency call, multiple location data structures that each provide respective indications of a location of the device under test;

selecting, by the cellular field testing tool, a comparison location data structure from the multiple location data structures by applying a selection policy to the multiple location data structures;

comparing, by the cellular field testing tool, the comparison location data structure to an identification of a location of the device under test according to a ground truth database; and outputting, by the cellular field testing tool, an indication of whether the device under test passes or fails a corresponding performance test based on comparing the comparison location data structure to the identification of the location of the device under test according to the ground truth database;

wherein:

the selection policy selects the comparison location data structure at least in part by comparing an indication of horizontal and vertical uncertainty for the comparison location data structure with an indication of horizontal and vertical uncertainty for a distinct data structure within the multiple location data structures.

* * * * *